UNITED STATES PATENT OFFICE.

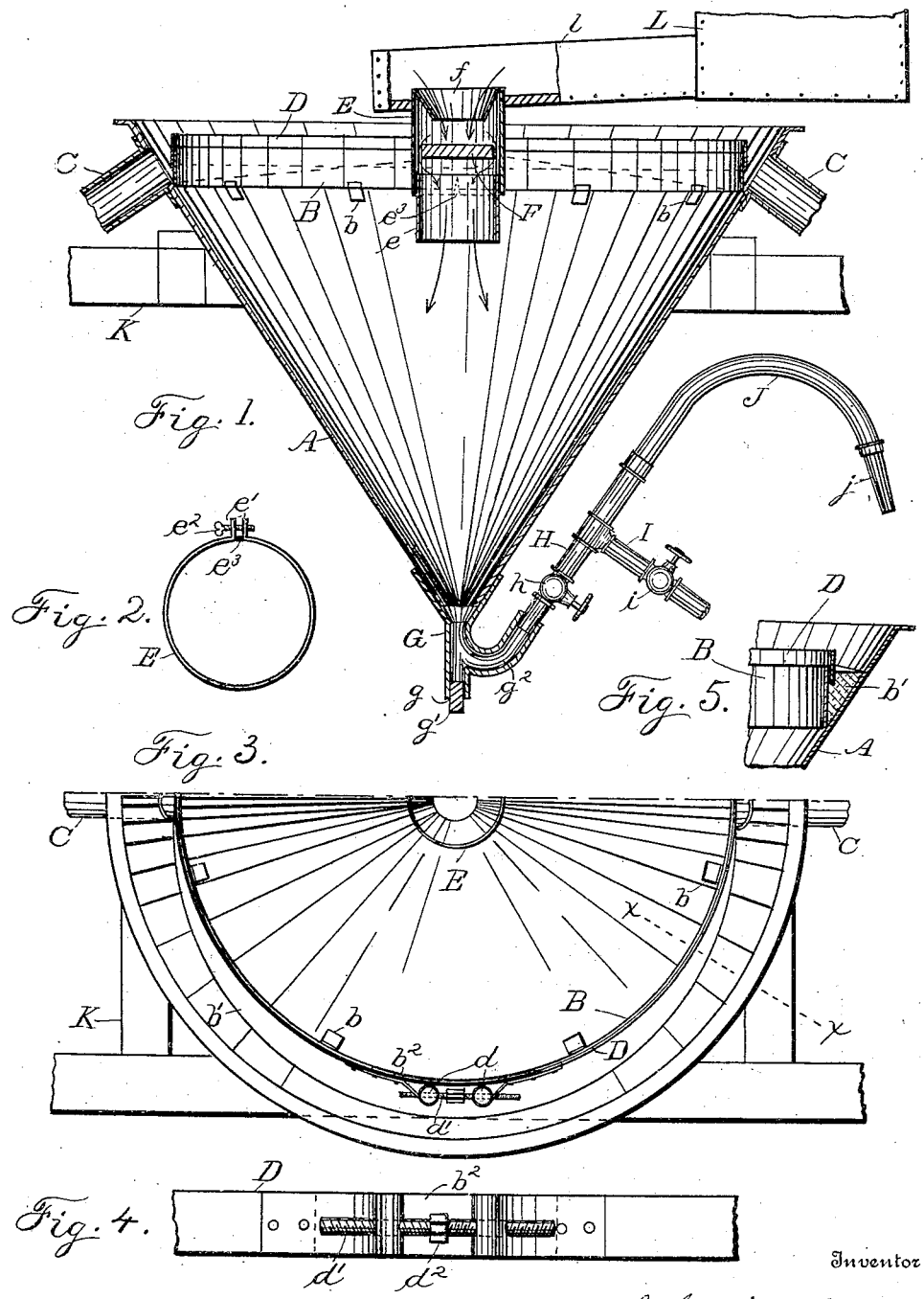

JOHN MICHAEL CALLOW, OF SALT LAKE CITY, UTAH.

SETTLING-TANK.

No. 824,279.　　　Specification of Letters Patent.　　　Patented June 26, 1906.

Application filed July 14, 1904. Serial No. 216,610.

*To all whom it may concern:*

Be it known that I, JOHN MICHAEL CALLOW, a subject of the King of Great Britain, residing at Salt Lake City, in the county of Salt Lake and State of Utah, have invented new and useful Improvements in Settling-Tanks, of which the following is a specification.

This is a device for settling finely-divided material held in suspension in water, and finds its chief use in ore concentration. The funnel form of tank is the best shape to withstand the weight of its contents and the strains being all tensile ones very thin metal can be used in its construction and yet give great rigidity and strength.

This device offers the advantage of a centrally-situated feed-tube which delivers the material below the surface of the water in the tank, so as to avoid agitation of the surface and also to submerge and entrap all particles liable to float off in the overflow.

Another advantage is the V-shaped channel between the sides of the tank and the overflow-ring, which is made sloping to the overflow-gutters by the same material which makes a water-tight joint between the parts mentioned.

Additionally the means employed for adjusting the overflow-band to a perfect level, the means for flushing the discharge-ducts, and of regulating the consistency and volume of pulp-discharge constitute novelty in the art of concentration.

The accompanying drawings illustrate the device, its various features being referred to by letters, similar letters denoting corresponding parts in the several views.

Figure 1 is a vertical mid-section of the device. Fig. 2 is an enlarged plan of the lower end of the upper section of the feed-tube. Fig. 3 is a plan view of one half of the tank. Fig. 4 is an enlarged side elevation of part of the overflow-band and showing the means employed for tightening the band on the ring, and Fig. 5 is a vertical section of the upper part of the tank, on line $xx$ of Fig. 3.

The letter A designates the funnel-form settling-tank, which is preferably made of metal. This tank is set in a frame K, so that its top will be approximately level.

B is a thin ring set horizontally in the tank, with its lower edge resting against the side of the tank and its upper edge somewhat below the upper edge of the tank. This ring is held in place by lugs $bb$, and its connection with the tank is made water-tight by a layer of cement $b'$. This cement is applied so as to make the bottom of the V-shaped channel $b^3$ inclined from a median line across the tank down to the gutters or vent-pipes C C at opposite sides of the upper part of the tank.

D is a band on the ring B and vertically adjustable upon it, being held thereon by a tightener formed of short cylinders $d$, held in loops formed by the ends of the band. These cylinders are drawn toward each other by a right-and-left screw-bolt $d'$, provided with a wrench-seat $d^2$. The space between the loops of the band is covered by a short piece $b^2$ of the band material.

L is the main launder, containing the slimes, which are drawn off by a lateral $l$ and directed into the feeder. The upper member E of this feeder is fixed to the chute $l$ and its lower member telescopes into the upper member. The upper member has a vertical slit $e^3$ in its bottom and is provided on each side of said slit with jaws $e'$ $e'$, which are adapted to be drawn toward each other by a set-screw $e^2$. By these means the two members are held together.

F is a disk-shaped float of less diameter than the feeder and located therein, and $f$ is the funnel-shaped entrance at the upper end of the feeder.

G is a hollow casting serving as the tank-exit, being fitted upon the bottom of said tank. This casting has a bottom opening $g$, stopped by a plug $g'$, and a lateral duct $g^2$, which curves upwardly and connects with a pipe H, having the same inclination as $g^2$. The pipe H has a valve $h$, and beyond this valve $h$ it connects with a pressure water-pipe I, provided with a valve $i$. Beyond the pipe I the pipe H connects with a flexible hose J, with a terminal nozzle $j$.

In using this device the slimes are admitted into the receiver E and pass down through the funnel $f$, by which they are directed to fall upon the float F. The slimes pass smoothly over the edges of this float down through the lower part of the feeder and into the tank A. When the tank has been filled, the slimes are thus delivered into the tank below the surface of its contents without materially agitating its contents and gradually extend out toward the sides of the tank. The slimes are fed in a continuous small stream or intermittently, time being given for the settling of the values into the lower part of the tank. The water having deposited the matters held in suspension by it becomes clear at the top and flowing over the ring B and band D runs down the inclined channel $b^3$ and out through the pipes C C. The band D must be adjusted to an exact level to secure the best results. The valuable sediment in the lower part of the tank is drawn off through the pipes G and H and passes out through the hose J for further treatment. The pipe H should stand approximately parallel to the adjacent side of the tank, and the pliant hose J is adjusted by raising or lowering the nozzle to secure the proper degree of tank-pressure in drawing out the settlings, which vary in consistency, according to the material fed into the tank. If the pipe H and the hose become clogged, they are easily cleared by closing valve $h$ and opening valve $i$ in the water-pressure pipe I, and when the tank is not in use its lower end and the casting G are flushed out by removing the plug $g'$, opening valves $h$ and $i$, and pinching the hose J.

What I claim, and desire to secure, is—

1. A settling-tank, a vertical feeder thereon comprising a telescopic tube, a funnel in said tube and a float in said tube beneath said funnel as herein set forth.

2. A settling-tank, a tubular feeder thereon attached to a launder, a funnel in said feeder and a disk float in said feeder beneath said funnel for the purpose specified.

3. A settling-tank, a vertically-adjustable feeder thereon, attached to a launder, a funnel in said feeder and a float in said feeder beneath said funnel for the purpose stated.

4. In a settling device, a funnel-form tank, a ring placed interiorly of said tank and forming with the wall of the tank a channel therein, said channel provided with outlets and a bottom inclining toward said outlets, a band of flexible material supported upon said ring and means for tightening or loosening said band whereby said band may be variably adjusted at different portions of the circumference of the ring to secure a perfectly level overflow, as described.

In testimony whereof I have signed my name to this specification in the presence of two subscribing witnesses.

JOHN MICHAEL CALLOW.

Witnesses:
 WILLIAM R. HALL,
 JOHN C. NUGENT.